United States Patent [19]

Cipriani

[11] 4,167,503

[45] Sep. 11, 1979

[54] LIQUID COLORANT/ADDITIVE CARRIER FOR USE IN COMPOUNDING POLYMERS

[76] Inventor: Cipriano Cipriani, 9 Sunderland Dr., Morristown, N.J. 07960

[21] Appl. No.: 855,234

[22] Filed: Nov. 28, 1977

[51] Int. Cl.$^2$ .................... C08K 5/06; B01F 3/20
[52] U.S. Cl. .................... 260/33.2 R; 8/1 XA; 8/93; 106/308 Q; 252/9; 252/51.5 A; 252/350; 252/363.5; 260/37 N; 260/42.21; 260/42.46; 260/42.54; 260/42.57; 521/79; 521/143; 521/149
[58] Field of Search .................... 252/350, 363.5, 309, 252/9, 51.5 A; 106/308 Q; 8/93; 260/37 N, 42.21, 42.46, 42.54, 42.57, 33.2 R

[56] References Cited

U.S. PATENT DOCUMENTS

| | | | |
|---|---|---|---|
| 1,930,853 | 10/1933 | Kollek et al. | 252/306 X |
| 3,706,708 | 12/1972 | Kearnan et al. | 252/363.5 X |
| 3,956,008 | 5/1976 | Knepper et al. | 106/308 Q X |

OTHER PUBLICATIONS

"Information on Applications of Pluronics", Wyandotte Chemicals Corp., Wyandotte, Mich., Mar. 1, 1952, pp. 2, 3 and 12.

*Primary Examiner*—Richard D. Lovering

[57] ABSTRACT

An improved liquid carrier system for dispersing into polymeric compositions various modifying ingredients such as pigments, colorants, organic dyes, and other additives is disclosed. The additive carrier system is used for coloring and for compound polymers either by coating the resin with the liquid additive prior to processing, or preferably, by metering said additive directly into an extruder or molding machine which is used to manufacture the polymer product in any of its various forms, e. g. pellets, fibers, films, sheets, and other plastic materials.

21 Claims, No Drawings

LIQUID COLORANT/ADDITIVE CARRIER FOR USE IN COMPOUNDING POLYMERS

BACKGROUND OF THE INVENTION

A conventional procedure for coloring plastic materials, or to introduce additive thereto, is to tumble in a drum the natural resin with the additive such as coloring powder, or with polymer pellets or flakes containing high concentration of colorant or other additive. The blended plastic material is then transferred, from the drum to the hopper feeding the extruder's or molding machine's screw which then plasticates and incorporates the colorant or additive into the molten polymer.

Recently, in-line blending systems have been employed for adding prescribed amounts of colorants to the natural resin and for continuously feeding the compounded material directly into the plastic machine's hopper. Various disadvantages are associated with the foregoing compounding procedures. One important disadvantage is that pigment agglomerates fail to get dispersed and are most likely to be introduced with both the coloring powder and the color concentrates into the finished product resulting in loss of color value and in a product of inferior quality, lack of homogeniety, and lower mechanical properties. Another disadvantage of this method is that the additive tends to segregate from the solid resin during transfer and also while in the hopper, because of the difference in specific gravity and/or particle size existing between the polymer and the additive. This segregation of the various materials results in a non-uniform distribution of the additive in the polymer matrix, causing color and physical property variations in the end-product. All these problems can be overcome by introducing the color or other additive as a liquid composition.

Liquid carriers for the preparation of liquid colorants suitable for application in polymers, plastics, films, and fibers have been disclosed heretofore. As such for example is the system described in the Knepper U.S. Pat. No. 3,956,088. The applicability of said prior systems, however, has been substantially limited. For example, such carriers have been inadequate due to pigment settling, incompatibility with the host polymeric material resulting in exudation, insufficient heat stability causing processing problems, interference with the mechanical and physical properties of the end-product, or to a combination of two or more of these undesirable factors.

The forementioned disadvantages can be overcome by first dispersing the additive in a suitable liquid carrier and then by pumping the prescribed quantity of this liquid dispersion directly into the throat of the extruder or molding machine. To avoid "bridging" and screw slippage, which generally occur when the liquid additive is introduced at the hopper, the liquid color is preferably metered into the molten polymer. In a more preferred embodiment, the liquid additive composition is metered into a static mixing assembly which is positioned at, or contiguous to, the exit end of the extruder or molding machine and receives the polymer melt from the plasticating screw. A system of this kind is disclosed in my copending U.S. patent application Ser. No 780,028 filed on Mar. 22, 1977.

In some systems it may be advantageous in facilitating the dispersion of the additive in the plastic material to introduce an increment of the total carrier (without additive) to the polymer composition and thereafter introduce the additive in composition with the balance of the liquid carrier. This has the effect of preconditioning the polymer composition such as by partially wetting the polymer thereby making it more receptive to the dispersion of the liquid colorant and/or other additive when it is introduced with the common liquid carrier into the polymer.

To be suitable for extrusion or molding applications, a carrier must possess at least several important characteristics. These characteristics include:

Good Dispersability. Additive agglomerates, which are broken up by shear stresses during mixing, must be prevented from re-forming. This is especially apparent with pigments. By eliminating or reducing the electrical charges present in the surface of the pigment's particles, the carrier should function to prevent the reformation of clusters or particles which tend to agglomerate through static attraction. In the case of organic or inorganic color pigments, small particle size results in greater color strength, more uniform distribution, improved physical properties, and better quality of the finished product. The latter two properties are particularly significant in fiber and film extrusion where pigment agglomerates cause yarn breakage and are clearly visible in thin-colored films.

High Polymer Loading. A carrier capable of retaining high concentrations, e.g. as high as 70–80%, should be possible for economical and processing reasons.

High Stability. The carrier preferably should withstand temperatures as high as 300° C. for short periods to be suitable for processing with a broad range of commercial resins.

Universal Application. For practical general usage, the carrier should be compatible with most commercial thermoplastic resins. This is an important factor in reducing inventory cost in molding and extrusion applications.

Avoidance of Detrimental Effect on Product Properties. To be avoided are adverse effects on mechanical properties, heat deflection temperature, crocking, heat sealability, printability, etc. The properties of heat sealability and printability are especially important in film applications.

Avoidance of Odor and Toxicity. This is important particularly in food packaging end-use where off-taste and extraction limits of additives in contact with food are often critical and toxicity must be avoided.

Although principally employed for the preparation of liquid colorants, the carrier should also be suitable for the production of multi-functional dispersions that combine colorant with other desirable additives. These additives may be UV absorbers, antioxidants, antistats, flame retardants, blowing and slip agents, or any combinations of two or more of these ingredients. In this way, a single system can impart multiple functional properties to the finished products at a substantial overall saving in manufacturing cost. Hence, unless specifically excluded, when the term colorant is employed for the purpose of describing the carrier system of this invention, it contemplates also additives in general.

SUMMARY OF THE INVENTION

It is the primary objective of this invention to provide a liquid carrier system for dispersing organic and inorganic colorants and/or other additives either by coating the resin with the system prior to processing or by metering and incorporating the system into the polymer during extrusion or molding of the plastic material. A particular advantage of the system of the invention is that the carrier combines all the essential requirements for its use in the production of fibers, films, sheets, and other plastic materials, such as good dispersing ability, stability to oxidation at elevated processing temperature, compatibility with most commercial resins, non-interference with the physical and mechanical properties of the finished product, no odor, no crocking, and also no extraction from plastic materials for food contact applications.

Another object of the present invention is to provide a novel liquid carrier composition permitting the production of liquid additives containing high concentration of pigments which are otherwise difficult to disperse, e.g. the phthalocyanines, and which possess the high degree of particle dispersion necessary to meet the opacity, processability, and the overall quality requirements demanded by the film and textile industry.

Additional objects and advantages will be apparent from the following description of the invention.

DESCRIPTION OF THE PREFERRED EMBODIMENT

The advantages of the invention are derived by the utilization of a novel additive composition for incorporating the colorant or other additives into the polymer. The composition comprises an additive for the polymer and a carrier system consisting essentially of an ethoxylated alkylphenol wherein the alkyl moiety of the alkylated phenol is selected from the group consisting of saturated $C_6$ to $C_{25}$ alkyl and dialkyl radicals; the phenol moiety of the alkylated phenol is selected from the group consisting of phenols and substituted phenols; and the number of moles of ethylene oxide per mole of alkylated phenol is between 1 and 40.

Optionally additional components are also incorporated into the carrier system, e.g. surfactants, plasticizers, antioxidants, and the like. In particular, the liquid carrier system which combines the desirable characteristics described earlier, comprises a prescribed proportion of an additive and the carrier (a) and additionally one or more of the components (b), (c), and (d) listed below.

(a) A liquid dispersing vehicle selected from the group consisting of ethoxylated alkylphenols which possesses excellent heat stability at polymer processing temperatures and encompassing a broad range of HLB (hydrophilic-lipophilic balance) values so that good wettability can be obtained on a variety of organic and inorganic additives.

(b) A nonionic surfactant selected from the group consisting of poly(alkylene ethers) to enhance the wetting and dispersing power of the ethoxylated phenol vehicle so that liquid colorants can be produced with high pigment loading and good particle dispersion for maximum color value and improved processability.

(c) Certain selected plasticizers to broaden the compatibility of the carrier with major commercial resins (for example polyvinyl chloride, polystyrene, and cellulosics) and also to modify the rheology of the carrier system so that the processing of some resins can be improved under specific extrusion and molding conditions.

(d) Selected antioxidants to protect the carrier system against high temperature oxidation which is sometimes encountered during certain extrusion and molding conditions.

The ethoxylated alkylphenols (a) comprising the carrier composition of this invention are the alkylphenoxy and dialkylphenoxypoly(ethyleneoxy)ethanols represented by the general formula:

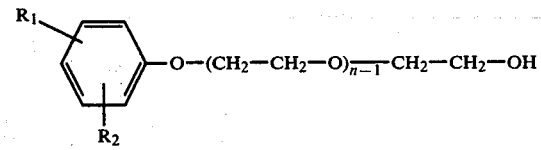

Wherein: $R_1$ and $R_2$ are saturated $C_6$ to $C_{25}$ alkyl groups and n equals the average number of moles of ethylene oxide per mole of alkylphenol group and it is in the range between 1 and 70.

As the amount of hydrophilic ethylene oxide combined with the lipophilic alkylphenol increases, both water solubility and the HLB value of the ethoxylated alkylphenol increase as illustrated in TABLE I.

TABLE 1

| Typical Ethoxylated Alkylphenols Vehicles for Incorporation into Liquid Compositions for Polymers | | | | |
|---|---|---|---|---|
| Alkyl group | EO mole ratio | EO wt% | HLB value (*) | Water solubility |
| $C_8H_{17}$ | 1 | 20 | 4 | Insoluble |
|  | 3 | 40 | 8 | " |
|  | 5 | 50 | 10 | Dispersable |
|  | 7 | 60 | 12 | Soluble |
|  | 9 | 65 | 13 | " |
|  | 12 | 75 | 15 | " |
| $C_9H_{19}$ | 3 | 40 | 8 | Dispersable |
|  | 4 | 45 | 9 | " |
|  | 5 | 50 | 10 | " |
|  | 6 | 55 | 11 | " |
|  | 9 | 65 | 13 | Soluble |
| di-$C_9H_{19}$ | 5 | 50 | 10 | Dispersable |
|  | 6 | 55 | 11 | Soluble |
|  | 9 | 65 | 13 | " |
|  | 12 | 75 | 15 | " |

(*)HLB value was calculated by dividing the weight percent of ethylene oxide (EO) in the alkylated phenol ether by 5.

Both the alkyl and particularly the dialkyl ethoxylated phenols possess the stability at elevated temperature which is required for the processing of high-melting engineering resins showing a minimum Flash Point of 250° C., as measured by the Cleveland Open Cup method, and a Smoke Point in excess of 200° C.

The concept of HLB value, as a yard-stick to measure the surface activity of surfactants, has been first introduced by Griffin (Re: Journal Society Cosmetic Chemists, 5, 1954, 259) and later amplified to the selection of surface active agents for colored pigments by Pascal and Reig (Re: Off. Dig. Federation Soc. Paint Technology, 36 (1964) 839).

Expanding this concept to high temperature, non-aqueous systems, I have found that the dispersion of a coloring pigment in the ethoxylated alkylphenol vehicle is enhanced by the addition of certain poly(alkylene ether) surfactants (b) such as polyethylene glycols and poly(ethylene-propylene)ether glycols in such a proportion as to produce the required HLB value. Preferred examples of poly(alkylene ether) surfactants suitable in the application of this invention are set forth in TABLE II

TABLE II

Typical Poly(alkylene ether) Surfactants for Incorporation into Liquid Compositions for Polymers.

| Compound | Average molecular weight | EO mole ratio | POP ave. molecular weight | HLB value | Solubility in water |
|---|---|---|---|---|---|
| Poly(ethylene-propylene)ether glycol | 4400 | 10 | 4400 | 0.5 | Insoluble |
| | 3810 | 10 | 3250 | 1.0 | " |
| | 2750 | 10 | 2250 | 2.0 | " |
| | 2000 | 10 | 1750 | 3.0 | " |
| | 5000 | 20 | 4000 | 4.0 | " |
| | 1630 | 20 | 1200 | 8.0 | Soluble |
| | 1850 | 30 | 1200 | 12.0 | " |
| | 2900 | 40 | 1750 | 15.0 | " |
| | 2200 | 40 | 1250 | 16.0 | " |
| | 1900 | 50 | 950 | 18.5 | " |
| Polyethylene glycol | 200 | 10 | — | — | Soluble |
| | 300 | 14 | — | — | " |
| | 400 | 17 | — | — | " |
| | 600 | 23 | — | — | " |

The carrier's ability to disperse and keep in suspension high concentration of pigments at the lowest possible cost is an important factor not only in regard to the economics of the system, but particularly in relation to its effect on the properties of the plastic materials. In fact, a too high residual concentration of the carrier left in the extruded or molded plastic end-product may have a detrimental effect on its physical and tensile properties.

The cost/performance factor for the liquid carrier of this invention is improved by the addition of certain extender-plasticizers (c) selected from the group of the alkyl and aryl esters of $C_1$ to $C_{22}$ linear or branched alkylalcohols. The preferred compounds are the ones which are characterized by a boiling point above 200° C. at 4 mm Hg, a Flash Point above 200° C. (Cleveland Open Cup method), a specific gravity at 25° C. lower than 1.0 and a viscosity at 20° C. not exceeding 150 cp. Illustrative extender-plasticizers meeting the foregoing specifications are set forth in TABLE III

TABLE III

Typical Extenders-Plasticizers for Incorporation into Liquid Compositions for Polymers.

| | Specific gravity @ 25° C. | Melting point °C. | Boiling point @ 4 mmHg | Flash point °C. | Viscosity @ 20° C. cp. |
|---|---|---|---|---|---|
| Phthalates | | | | | |
| Diisooctyl | .980 | −25 | 220 | 229 | — |
| Diisononyl | .972 | −48 | — | 230 | 102 |
| Diisodecyl | .968 | −50 | — | 232 | — |
| Diisododecyl | .968 | −50 | 250 | 232 | 125 |
| Diisotridecyl | .952 | −37 | — | 230 | 129 |

TABLE III-continued

Typical Extenders-Plasticizers for Incorporation into Liquid Compositions for Polymers.

| | Specific gravity @ 25° C. | Melting point °C. | Boiling point @ 4 mmHg | Flash point °C. | Viscosity @ 20° C. cp. |
|---|---|---|---|---|---|
| Dicapryl Adipates | .965 | −60 | 230 | 207 | — |
| Diisooctyl | .922 | −70 | 220 | 210 | 10 |
| Diisononyl | .912 | −59 | 260 | 225 | 22 |
| Octyldecyl Azelates | .920 | −60 | 210 | 230 | 25 |
| Dioctyl | .917 | −65 | 227 | 213 | 10 |
| Cyclohexyl | 1.0 | — | — | 230 | — |

In order to render the liquid carrier more useful for the purpose of this invention, it is preferable that said carrier be protected against the high oxidative degradation to which it is subjected during certain high temperature extrusion and molding conditions. This is accomplished by dissolving or dispersing a suitable antioxidant (d) into the liquid carrier during the preparation of the colorant.

In addition to its thermal stability, the selection of a suitable antioxidant is based also on its ability to resist volatilization during processing and service, its resistance to extraction, its non-toxicity, its photostability, and its gas-fading resistance. Typical antioxidants which meet the requirement discussed above and which are particularly suited to be used in conjunction with the liquid carrier of this invention, are selected from the group of hindered phenols and set forth in TABLE IV.

TABLE IV

Typical Antioxidants for Incorporation into Liquid Composition for Polymers

| | Melting point, °C. |
|---|---|
| Alkylated monophenols | |
| 2,6,-ditertiarybutyl-p-cresol; | 70 |
| Octadecyl-3-(3',5'-ditertiary-butyl-4-hydroxyphenyl)propionate; | 50 |
| Alkylated polyphenols | |
| Tetrabis[methylene-3-(3',5'-ditertiary butyl-4-hydroxy-phenyl)propionate]methane; | 110 |
| 1,1,3,-tris(2'-methyl-4-hydroxy-5-tertiarybutyl phenyl)butane; | 183 |
| Tris-(3,5-ditertiarybutyl-4-hydroxybenzyl)isocyanurate; | 221 |
| 2,2'methylenebis(4-ethyl-6-tertiarybutylphenol); | 118 |

TABLE IV-continued
Typical Antioxidants for Incorporation into Liquid Composition for Polymers

| | Melting point, °C. |
|---|---|
| 1,3,5-trimethyl-2,4,6-tris(3,5-tertiarybutyl-4-hydroxybenzyl)benzene; | 244 |
| 2,2'-methylenebis(4-methyl-6-tertiarybutylphenol); | 130 |
| 2,6-bis(2'-hydroxy-3-tertiarybutyl-5-methylbenzyl)-4-methylphenol; | 171 |
| Alkylated thiobisphenols | |
| Thiodiethylenebis-(3,5-ditertiary-butyl-4-hydroxy) hydrocinnamate; | 63 |
| 4,4'-thiobis-(6-tertiarybutyl-m-cresol); | 160 |
| 4,4'-thiobis-(6-tertiarybutyl-o-cresol); | 125 |

The amount of antioxidant employed may vary within fairly broad limits. Generally minimal (i.e. a small but effective) quantity is sufficient. For example, amounts as little as 0.01 percent to about 20 percent based on the weight of the carrier may be employed. Generally amounts of between 0.05 and about 12 percent are preferred.

The preparation of a liquid colorant or additive suitable for coating resin pellets or for incorporation into a polymer at the extruder or molding machine through an in-line metering system, involves dispersing the proper pigment, dye, or other additive into the carrier preferably stabilized according to the teaching of this invention. Moreover in the case of a colorant, for example, its usefulness in the embodiment of this invention depends upon a number of important factors. Some of these factors include stability during processing and under various environmental end-use conditions, crocking, compliance with health regulations, cost, etc. An example of typical suitable colorants is the following:

Inorganic Type. Titanium dioxide, iron oxide, zinc chromate, cadmium sulfides, chromium oxides, sodium silicate complexes, metal flakes, and the like.

Organic Type. Carbon black, azo pigments (red maroons), phthalocyanines (blues, greens), quinacridone pigments (gold, orange, scarlet, red, violet, magenta), perylene pigments (yellow, maroons), isoindolidones, anthraquinones (yellow, scarlet, reds), thioindigo (reds, maroons), acid dye pigments (reds), and the like.

Typical examples of additives other than colorants, which are suitable for use with the carrier of this invention, either alone or in conjunction with a colorant, include:

Antistatic Agents. Suitable are those products which are stable at temperatures above 200° C.

UV Absorbers. Such as benzophenones, benzotriazoles, sterically hindered amines, and other types.

Flame Retardants. Such as phosphate esters, halogenated organic and inorganic materials, aluminum and antimony oxides, and the like.

Heat Stabilizers. Organo-tins, calcium, barium, strontium/tin, barium/cadmium/zinc phosphites, and the like.

Mold Release/Lubricants/Slip Agents. Metal stearates and stearic acid, silicone oils, glycerol and polyglycerol esters, amides derived from fatty acids, and others.

Foaming Agents. Tetrazole type, trihydrazide triazine type, hydrazine derivatives, p-toluene sulfonyl semicarbazide, and many others.

Filler/Reinforcing Materials. Calcium carbonates, aluminum trihydrate, silica and silanes, mica, glass fibers, asbestos, and others.

Catalysts. Polyisocyanurates, organotin, organomercurial urethane catalysts for use in reaction injection molding (RIM) as well as in semirigid isocyanurate and urethane foams.

The amount of additive may vary within broad limits. Generally from 0.1 percent to 80 percent based on the weight of the carrier may be used. Preferably from about 5 percent to about 20 percent is sufficient for additives other than colorants and 20 percent to 70 percent may be the optimum concentration for colorants.

In the practice of the present invention, the liquid carrier, the surfactant, the extender-plasticizer, the antioxidant, and the various polymer additives are mixed together to form a homogeneous dispersion. This dispersion may then be added in measured amounts to the polymer either by tumbling with the resin or by pumping the dispersion into the feed throat of a plastic machine or preferably metering into the polymer's melt stream in order to avoid "bridging" and screw slippage, as mentioned earlier.

The invention will be further described by way of the following specific examples which are to be regarded solely as illustrative and not as limitations on the scope of the invention except as set forth in the appended claims. In the examples, parts stated are parts by weight unless expressed otherwise.

EXAMPLE 1

A blue liquid colorant suitable for coloring polymeric materials for extrusion or molding applications, was produced and utilized according to the following procedure:

| | Parts in dispersion | Parts in carrier |
|---|---|---|
| Phthalocyanine | 35.0 | — |
| Ethoxylated alkylphenol | 61.7 | 95.0 |
| Poly(ethylene-propylene) ether glycol | 3.3 | 5.0 |
| | 100.0 | 100.0 |

Into a 2500 mls. laboratory beaker, 350 parts of American Cyanamid phthalocyanine blue Type 55-3745 were added slowly to 617 parts of ethoxylated alkylphenol containing 33 parts of poly(ethylene-propylene)ether glycol nonionic surfactant while the liquid was maintained under high-shear agitation by means of an Arde-Barinco mixer/homogenizer (Arde-Barinco: Mahwah, N.J.). The ethoxylated alkylphenol vehicle employed is available from Diamond-Shamrock, Morristown, N.J. under the trade name of NOPCOSTAT HS and it is characterized as follows: ethylene oxide molar ratio about 12; HLB value 14.6; Flash Point 288° C.. The poly(ethylene-propylene)ether glycol used as surfactant has an ethylene oxide molar ratio of 30, an average molecular weight of 1850, a HLB value of 12.0, and it is available from BASF-Wyandotte, Wyandotte, Michigan under the brand name of PLURONIC L-43.

Operating the mixer for about 20 minutes at speeds up to 10,000 rpm in both the down and up modes, a smooth paste was obtained which showed no pigment agglomerates greater than 20 microns. The dispersion was found to have a shelf life of at least six months after which period it was employed for the mass coloring of polypropylene fibers in accordance with the procedure described below. A fiber grade polypropylene resin (Novamont Corporation, New York) was supplied through the extruder's hopper while the liquid color was metered into the extruder's vent port by means of a Zenith gear pump. By synchronizing the metering pump's rpm with the rpm of the extruder's screw, a polymer-to-liquid colorant ratio of 97:3 was maintained so that about 1 part of the phthalocyanine pigment was introduced into the polymer. The melt emerging from the extruder was received by a Koch static mixer (Koch Engineering Co., New York) which homogenized and delivered the melt to a 70-hole die forming filaments. The filaments were subsequently wound onto a bobbing rotating at a linear speed of 300 meters per minute, oriented at a draw ratio of 4:1 and textured by means of a staffing box. The textured multi-filament yarn had a denier of 1200, a tenacity at break of 5.6 grams per denier with 72% ultimate elongation, and 12.7 crimps per inch. A 12 oz/sq.yd. level loop carpet tufted from this yarn showed excellent color uniformity. No abnormal increase in pressure was registered on a 250 mesh filter screen during extrusion, confirming the absence of large pigment particles in the polymer melt.

EXAMPLE 2

The same colorant preparation and extrusion procedures described in EXAMPLE 1 were followed with the exception that the liquid color formulation contained an ultraviolet light absorber, as shown below:

|  | Parts in dispersion | Parts in carrier |
|---|---|---|
| Phthalocyanine blue | 35.0 | — |
| Ethoxylated alkylphenol | 54.0 | 83.0 |
| Poly(ethylene-propylene) ether glycol | 3.0 | 4.6 |
| UV absorber* | 8.0 | 12.4 |
|  | 100.0 | 100.0 |

*Substituted hydroxyphenyl benzotriazole available from Ciba-Geigy Corporation under the brand name of TINUVIN P.

0.24 parts of the UV absorber were introduced into the yarn with the colorant.

EXAMPLE 3

A yellow liquid colorant suitable for the mass coloring of nylon fiber was produced and utilized as follows:

|  | Parts in dispersion | Parts in carrier |
|---|---|---|
| Chrome yellow | 70.0 | — |
| Ethoxylated alkylphenol | 25.5 | 85.0 |
| Polyethylene glycol | 4.5 | 15.0 |
|  | 100.0 | 100.0 |

45 parts of polyethylene glycol with an average molecular weight of 600 and an ethylene oxide molar ratio of 23 was used as nonionic surfactant. This surfactant, which is available from Union Carbide under the brand name of "Carbowax 600," was poured into a 2500 mls glass beaker containing 255 parts of nonylphenoxy poly(ethyleneoxy) ethanol liquid carrier characterized by an ethylene oxide mole ratio of 11 and a HLB value of 14. This ethoxylated alkylphenol is available from GAF Corporation, New York, under the brand name of Egepal CO-720. 700 parts of Du Pont yellow 433 were then added slowly to the liquid carrier which was maintained under high-shear mixing until a smooth, free-flowing dispersion was obtained which contained no pigment agglomerates greater than 10 microns. Assisted by 80 psi air pressure, the colorant was subsequently fed into the inlet of a Zenith gear pump which metered the colorant into the polymer melt stream through the vent port of a 2½ inch extruder equipped with a Koch static mixer and producing carpet yarn from nylon-6 polymer (Dow Badische Co., Williamsburg, Va.). The polymer-to-additive ratio was controlled at 98.5:1.5 by synchronizing the Zenith pump rpm with the rpm of the extruder's screw so that 1 part of the chrome yellow pigment was introduced into the yarn. The pigment was well dispersed in the yarn and no abnormal pressure build-up during extrusion was observed. After orientation and texturing by means of an air jet, the textured yarn had a denier of 1200 and a tenacity at break of 5.6 grams per denier with 69% elongation. The presence of the carrier in the finished yarn had no detrimental effect on the resiliency of the fiber as determined by elastic recovery measurement. Tests for crocking, performed by boiling in water samples of the colored yarn together with white nylon of the same denier, were negative.

EXAMPLE 4

The preparation of the liquid colorant and the extrusion procedure were the same as in EXAMPLE 3 with the exception that the colorant formulation contained an antioxidant, as set forth below:

|  | Parts in dispersion | Parts in carrier |
|---|---|---|
| Chrome yellow | 70.0 | — |
| Ethoxylated alkylphenol | 20.5 | 68.3 |
| Polyethylene glycol | 2.5 | 8.3 |
| Antioxidant | 7.0 | 23.4 |
|  | 100.0 | 100.0 |

2,6 di-tertiary-butyl-para-cresol (Ashland Chemical Co.: CAO-1) was employed as the antioxidant which was metered into the polymer with the colorant. The finished yarn contained 0.1 part of the antioxidant.

EXAMPLE 5

A green liquid colorant suitable for the mass coloring of polyester fibers was prepared and utilized as follows:

|  | Parts in dispersion | Parts in carrier |
|---|---|---|
| Phthalocyanine green | 35.0 | — |
| Ethoxylated dialkylphenol | 55.9 | 86.0 |
| Poly(ethylene-propylene) ether glycol | 9.1 | 14.0 |
|  | 100.0 | 100.0 |

559 parts of dialkylphenoxy poly(ethyleneoxy)ethanol with 12 mole ratio of ethylene oxide and a HLB value of 13 (available from GAF Corporation under the brand name of IGEPAL DM-710) were mixed with 91 parts of poly(ethylene-propylene) ether glycol surfactant in a 2500 mls. laboratory beaker. The poly(alkylene ether) surfactant, which has an average molecular weight of 1900, an ethylene oxide molar ratio of 50, and a HLB value of 18.5, is sold by BASF-Wyandotte under the brand name of PLURONIC L-35. Operating an Arde-Barinco mixer/homogenizer at high speed and reversing its mode frequently, 350 parts of phthalocyanine green (Du Pont Type 6T-761-D) were slowly added into the liquid carrier until a smooth paste was obtained which contained no pigment agglomerates greater than 20 microns in size.

The colorant was then transferred into a pressure vessel and fed to the inlet of a Zenith metering pump by means of air at 100 psi. Synchronizing the pump rpm with the rpm of the extruder's screw in order to maintain a polymer-to-liquid color ratio of 97:3, 1 part of the phthalocyanine green pigment was introduced into the hopper of a 2½ inch extruder together with PET fiber grade polymer (VITEL by the Goodyear Co.). Filaments were extruded downward from a 34-hole spinnerette and wound into a bobbing rotating at a peripheral speed of 300 meters per minute. After drawing at 4.2:1 draw ratio and texturing on a false-twisting machine, the yarn showed a final denier of 164, a tenacity at break of 4.5 grams per denier and 75% elongation. No unusual filter pack build-up was observed during extrusion, as it is often the case when the colorant is added by dry blending with coloring powder or with color concentrate. The green pigment was well dispersed into the yarn (as determined by cross-sectional microscopic examination) which was employed in the production of apparel fabrics by the circular and warp knitting procedures.

EXAMPLE 6

A white liquid colorant having a high concentration of pigment and suitable for film and coating applications was prepared and utilized as follows:

|  | Parts in dispersion | Parts in carrier |
| --- | --- | --- |
| Titanium dioxide | 75.0 | — |
| Ethoxylated alkylphenol | 25.0 | 100.0 |
|  | 100.0 | 100.0 |

750 parts of Du Pont TiO$_2$ Type R-100 were mixed under high shear with 250 parts of ethoxylated alkylphenol available from Diamond-Shamrock Corp., Moristown, N.J. under the brand name of NOPCOSTAT HS. NOPCOSTAT HS has about 11 mole ratio of ethylene oxide, a HLB value of 14.6 and a Flash Point of 288° C. After about 20 minutes of intensive mixing, a smooth, highly viscous, free-flowing dispersion was obtained which contained no pigment agglomerates greater than 10 microns in diameter. The color dispersion was then transferred into a pressurized vessel and fed to a Zenith gear pump which metered the colorant into the vent port of a 1 inch extruder equipped with a Koch static mixer and supplied at the hopper with Exxon Type 104 low density polyethylene resin. By synchronizing the Zenith pump rpm with the rpm of the extruder's screw, a polymer-to-colorant ratio of 98:2 was maintained so that 1.5 parts of TiO$_2$ were injected into the melt. The static mixer delivered the homogenized colored melt to a circular die which produced a blown film of 1.5 to 2.5 thousandth of an inch thick. The TiO$_2$ pigment was uniformly distributed in the film which was free of agglomerates. Tests conducted in boiling water showed that the colorant was bonded into the polymer matrix and did not leach out to stain a black paper which was in contact with the film.

EXAMPLE 7

The procedure of EXAMPLE 6 was essentially repeated, except that 20 parts of the ethoxylated alkylphenol were used in forming the color dispersion and 5 parts of the ethoxylated alkylphenol were used to precondition the polymer by metering it into the polymer upstream of the vent port of the extruder through which the color dispersion was metered. A uniformly colored polymer is produced from which no leaching of colorant is observed.

EXAMPLE 8

The procedure for the preparation of the liquid color and for the extrusion of blown film are the same as described in EXAMPLE 6, with the exception that the ethoxylated alkylphenol carrier contained a nonionic surfactant, as set forth below:

|  | Parts in dispersion | Parts in carrier |
| --- | --- | --- |
| Titanium dioxide | 75.0 | — |
| Ethoxylated alkylphenol | 18.7 | 75.0 |
| Poly(ethylene-propylene) ether glycol | 6.3 | 25.0 |
|  | 100.0 | 100.0 |

The poly(ethylene-propylene)ether glycol surfactant employed, which is available from BASF-Wyandotte under the brand name of PLURONIC L-64, has an average molecular weight of 2900, an ethylene oxide molar ratio of 40 and HLB value of 15. The color dispersion obtained was highly viscous but pourable, and it showed no visible agglomerates when observed under a 60 magnification microscope.

EXAMPLE 9

The preparation of a pumpable liquid dispersion suitable for imparting high slip characteristics to polyolefin films is described below.

|  | Parts in dispersion | Parts in carrier |
| --- | --- | --- |
| Slip agent | 49.0 | — |
| Ethoxylated dialkylphenol | 45.0 | 88.2 |
| Polyethylene glycol | 6.0 | 11.8 |
|  | 100.0 | 100.0 |

490 grams of oleoamide slip agent available from Armour Industrial Chemical Co. under the trade name of ARMID O were dispersed by high shear mixing into 450 grams of ethoxylated dialkylphenol containing 60 grams of nonionic surfactant. The ethoxylated dialkylphenol employed, which is available from GAF Corporation under the brand name of IGEPAL DM-530, has 6 mole ratio of ethylene oxide and a HLB value of 11. As surfactant, Union Carbide CARBOWAX 400 polyethylene glycol was employed. It has an average molecular weight of 400 and an ethylene oxide molar ratio ratio of 17. Following the procedure described in EXAMPLE 6, about 2 percent of the slip agent was introduced in the film by maintaining a pump-to-screw throughput ratio of 4:96. The film produced was very slippery.

EXAMPLE 10

The following liquid colorant formulation was used for the coloring of polyethylene resin during injection molding.

|  | Parts in dispersion | Parts in carrier |
|---|---|---|
| Phthalocyanine blue | 29.0 | — |
| Ethoxylated alkylphenol | 14.2 | 20.0 |
| Poly(ethylene-propylene) ether glycol | 35.5 | 50.0 |
| Diisononyl phthalate (DINP) | 21.3 | 30.0 |
|  | 100.0 | 100.0 |

290 grams of American Cyanamid phthalocyanine blue Type 55-3745 were added under very high shear mixing to a liquid carrier composed of 142 grams of NOPCO-STAT HS ethoxylated alkylphenol, 355 grams of PLURONIC L-61 anionic surfactant and 213 grams of DINP extender-plasticizer supplied by Exxon Chemical Co.. BASF-Wyandotte's PLURONIC L-61 is a poly-(ethylene-propylene)ether glycol with an average molecular weight of 2000, an ethylene oxide mole ratio of 10, and a HLB value of 3. About 0.9 percent of the phthalocyanine blue pigment was introduced into the polymer by coating 500 grams of low density polyethylene pellets with 15 grams of the liquid colorant in a plastic bag. The coated pellets were then introduced into the hopper of a Gloucester 1-inch injection molding machine and molded into chips at a temperature of 177° C. and under a 25-second molding cycle. The chip samples produced were very uniform in color and showed excellent pigment dispersion. Colored chips boiled in water in contact with strips of white paper showed no staining or crocking.

EXAMPLE 11

The liquid colorant preparation and injection molding procedures described in EXAMPLE 9 were employed with the exception that the colorant formulation was changed as set forth below:

|  | Parts in dispersion | Parts in carrier |
|---|---|---|
| Orange color pigment | 29.0 | — |
| Ethoxylated alkylphenol | 39.0 | 55.0 |
| Poly(ethylene-propylene) ether glycol | 19.2 | 27.0 |
| Diisodecyl phthalate (DIDP) | 12.8 | 18.0 |
|  | 100.0 | 100.0 |

Ciba-Geigy Orange 4-R was used as the coloring pigment and Exxon Chemical Co.'s DIDP as the extender-plasticizer. The injection molded colored chips produced showed that the color was uniform and that the pigment was well dispersed in the polymer matrix.

EXAMPLE 12

A liquid dispersion of a blowing agent particularly suited for the production of foamed polystyrene articles was prepared and utilized as follows:

|  | Parts in dispersion | Parts in carrier |
|---|---|---|
| Foaming agent | 47.5 | — |
| Ethoxylated alkylphenol | 41.2 | 78.5 |
| Polyethylene glycol | 11.3 | 21.5 |
|  | 100.0 | 100.0 |

Under high shear mixing, 475 grams of Stepan Chemical Co. KEMPORE blowing agent was dispersed in 412 grams of ethoxylated alkylphenol carrier containing 113 grams of polyethylene glycol surfactant. The ethoxylated alkylphenol employed was GAF's IGEPAL CA-630 octylphenoxy poly(ethyleneoxy)ethanol with 9 mole ratio of ethylene oxide and a HLB value of 13. Union Carbide's CARBOWAX 300 was used as surfactant which contained 14 ethylene oxide molar ratio and had an average molecular weight of 300. The foaming agent dispersion was then forced under 80 psi air pressure to the inlet of a Zenith gear pump which metered the dispersion into the vent port of a 2½ inch extruder equipped with a Koch mixer and supplied at the hopper with high impact polystyrene resin (Rexene Type 29: Rexene Polymer Co., Paramus, N.J.). The polymer-to-additive ratio was controlled at 98,5:1.5 so that about 0.7 percent of the foaming agent was injected into the melt which was forced through the static mixer followed by a profile die for the production of picture frame material. The foamed product showed a reduction of 30% in density (to 0.45–0.48 grams/cm$^3$) over the untreated material because of the formation of a cellular structure by the decomposition of the foaming agent. In a comparative trial in which the blowing agent was added to the polystyrene pellets at the hopper by dry-blending, a high-density non-uniform product resulted because of the premature activation of the blowing agent and loss of gas generation by the decomposing agent.

EXAMPLE 13

A multi-functional liquid additive particularly suitable for coloring and foaming polystyrene articles by extrusion or molding, was prepared as follows:

|  | Parts in dispersion | Parts in carrier |
|---|---|---|
| Titanium dioxide | 35.0 | — |
| Foaming agent | 35.0 | — |
| Ethoxylated alkylphenol | 30.0 | 100.0 |
|  | 100.0 | 100.0 |

EXAMPLE 14

A scarlet liquid color suitable for coloring polymeric materials during extrusion or molding was prepared and utilized as follows:

|  | Parts in dispersion | Parts in carrier |
|---|---|---|
| Scarlet pigment | 25.0 | — |
| Ethoxylated alkylphenol | 75.0 | 100.0 |
|  | 100.0 | 100.0 |

250 parts of Armon Colors Indofast Brilliant Scarlet R 63351 were slowly dispersed by high-shear mixing into 750 parts of carrier composed of nonylphenoxypoly(ethyleneoxy)ethanol. The alkylphenol employed is available from Union Carbide under the brand name of TERGITOL NPX, and it is characterized by an average molecular weight of 682, an ethylene oxide molar ratio of 10.5, a HLB value of 13.6, and a Flash Point greater than 260° C.. The color dispersion obtained had the consistency of a paste and contained no agglomerates larger than 20 microns. Assisted by 100 psi air pressure, the dispersion was supplied to a Zenith gear pump which metered the liquid color into an injection molding machine's hopper containing low density polyethylene pellets. By synchronizing the rpm of the Zenith pump with the rpm of the molding machine's screw, a ratio of polymer-to-colorant of 97:3 was obtained so that 0.75 parts of the scarlet pigment was introduced into the molded plastic material. The colorant was compatible with the polymer since no leaching of color was detected.

EXAMPLE 15

The procedure of EXAMPLE 14 was followed except that octylphenoxypoly(ethyleneoxy)ethanol was employed as carrier. This ethoxylated alkylphenol is available from Rohm and Haas under the brand name of TRITON X-102, and it has the following characteristics: ethylene oxide molar ratio 12.5; HLB value 14.6; Flash Point above 260° C..

EXAMPLE 16

The same procedure described in EXAMPLE 14 was followed with the exception that a dialkylphenoxypoly(ethyleneoxy)ethanol was used as carrier. This alkylphenol, which is sold by GAF Corporation under the brand name of IGEPAL DM-720, has a HLB value of 13.0 and a Flash Point of 271° C..

I claim:

1. A liquid additive concentrate composition for incorporating into molten polymers during extrusion or molding, said composition consisting essentially of:
(a) a carrier comprising an alkylated phenoxy poly(ethyleneoxy)ethanol wherein the alkyl moiety of the ethoxylated phenol is selected from the group consisting of saturated $C_6$ to $C_{25}$ alkyl and dialkyl radicals and wherein the phenol moiety of the alkylated phenol is selected from the group consisting of phenols and substituted phenols and wherein the number of moles of ethylene oxide per mole of alkylated phenol is between 1 and 40 and
(b) an additive in an amount from 0.1 percent to 80 percent based on the weight of the carrier.

2. A composition in accordance with claim 1 wherein the alkylated phenoxypoly(ethyleneoxy)ethanol contains from about 1 percent to about 80 percent of a nonionic surfactant selected from the group consisting of a poly(alkylene ether), said poly(alkylene ether) having a molecular weight between about 300 and 6000.

3. The composition of claim 2 wherein said poly(alkylene ether) is polyethylene glycol.

4. The composition of claim 2 wherein said poly(alkylene ether) is poly(ethylene-propylene)ether glycol and wherein the poly(oxyethylene) content in the total molecule is between 1 and 60 moles percent and the balance is poly(oxypropylene) and wherein the average molecular weight of the poly(oxypropylene) is between 900 and 4000.

5. The composition in accordance with claim 1 which contains additionally an antioxidant in the range from about 0.01 percent to about 20 percent based on the weight of the alkylated phenoxypoly(ethyleneoxy)ethanol and wherein said antioxidant is an alkylated phenol.

6. The liquid composition of claim 1 which contains additionally a plasticizer selected from the group consisting of alkyl and aryl esters of $C_1$ to $C_{22}$ alkyl alcohols.

7. The liquid composition of claim 1 wherein the average number of moles of ethylene oxide per mole of alkylated phenol is between 7 and 20.

8. The composition in accordance with claim 1 wherein the additive is a colorant.

9. The polymer product containing the liquid colorant composition of claim 8.

10. The composition in accordance with claim 1 wherein the additive is a light stabilizer.

11. The polymer product containing the liquid additive composition of claim 10.

12. The composition in accordance with claim 1 wherein the additive is a blowing agent.

13. The composition in accordance with claim 1 wherein the additive is a slip agent.

14. A polymer product containing the liquid additive composition of claim 1.

15. The composition of claim 1 wherein the alkyl moiety of the ethoxylated alkylphenol is a $C_8$ alkyl and the number of moles of ethylene oxide per mole of alkylated phenol is between 7 and 15.

16. The composition of claim 1 wherein the alkyl moiety of the ethoxylated alkylphenol is a $C_9$ alkyl and the number of moles of ethylene oxide per mole of alkylated phenol is between 7 and 15.

17. The composition of claim 1 wherein the alkyl moiety of the ethoxylated alkylphenol is selected from the group consisting of $C_8$ to $C_{12}$ dialkyl radicals and mixtures thereof and wherein the number of moles of ethylene oxide per mole of dialkylphenol is between 7 and 15.

18. The composition in accordance with claim 1 wherein the additive is present in amounts from about 5 percent to about 20 percent based on the weight of the carrier.

19. The composition in accordance with claim 1 wherein the additive is a colorant and is present in amounts of from about 20 percent to about 70 percent based on the weight of the carrier.

20. The composition in accordance with claim 19 wherein the additive comprises a light stabilizer for the colorant containing composition.

21. A polymer product containing the liquid additive composition of claim 20.

* * * * *